United States Patent
Haraguchi et al.

[11] Patent Number: 6,071,557
[45] Date of Patent: Jun. 6, 2000

[54] CELL WITH A CLADDING MATERIAL INCLUDING A STAINLESS-STEEL PLATE AND AN ALUMINUM PLATE

[75] Inventors: Kazunori Haraguchi, Osaka; Hiroshi Yoshizawa, Hirakata; Takuya Nakashima, Neyagawa; Takashi Takeuchi, Kadoma; Kikuo Senoo, Kobe, all of Japan

[73] Assignee: Matsushita Electric Industrial Co., Ltd., Osaka, Japan

[21] Appl. No.: 09/161,908

[22] Filed: Sep. 28, 1998

[30] Foreign Application Priority Data

Sep. 30, 1997 [JP] Japan .................................. 9-266094

[51] Int. Cl.[7] .............................. H01M 2/02; H01M 2/06

[52] U.S. Cl. ............................................ 427/168; 429/164

[58] Field of Search ...................................... 429/168, 164

[56] References Cited

FOREIGN PATENT DOCUMENTS 9-320565  12/1997  Japan ............................... H01M 2/20
9-330696  12/1997  Japan ............................... H01M 2/30

Primary Examiner—Maria Nuzzolillo
Assistant Examiner—Mark Ruthkosky
Attorney, Agent, or Firm—Jordan and Hamburg LLP

[57] ABSTRACT

A square cell is configured by housing a generating element in a square case 1 that is formed in a square cylindrical shape having a bottom, of an aluminum material, the open end of which is hermetically sealed by a sealing plate 2. When a rivet 5 provided in the sealing plate 2 is electrically connected as a negative-polarity terminal, and the square case 1 is electrically connected as a positive-polarity terminal, a cladding material 4 wherein an aluminum plate and a stainless steel plate are clad-bonded is ultrasonically welded to the bottom surface of the square case 1, in order to facilitate making lead connections to the square case 1 formed of aluminum material.

20 Claims, 3 Drawing Sheets

CELL WITH A CLADDING MATERIAL INCLUDING A STAINLESS-STEEL PLATE AND AN ALUMINUM PLATE

BACKGROUND OF THE INVENTION

The present invention relates to a cell constituted by the housing of an electricity generating element such as a lithium ion secondary cell in an aluminum casing, and, more particularly, to a cell in which electrical connection with the aluminum casing, which is an electrode part, is easily arranged.

By way of example, secondary cells used as power sources for portable electronic instruments are required to be of a high energy density and, at the same time, are required to be of a shape efficient in terms of space used in order to achieve weight-lightness and compactness. A lithium ion secondary cell which uses a square aluminum casing is attracting the spotlight as a cell which fulfills these requirements.

Because the lithium ion secondary cell, in terms of its structure apart from anything else, is required to be hermetically stable over a long time, an aperture-sealing plate is bonded by laser welding to the open end of a square casing with a bottom, thereby sealing the open end. A rivet which serves as a negative electrode terminal is attached to the sealing plate such as to be insulated therefrom, and the square casing is used as a positive electrode terminal, thereby constituting both electrode terminals of the cell.

To both of the positive and negative terminals, it is necessary to connect a lead in order to execute electrical connection with the apparatus which uses the cell. In the case where the square casing is formed from an aluminum material, resistance welding and soldering are difficult, wherefore a construction is adopted in which a metal plate, which allows easy lead connection, is bonded to the square casing. Such a metal plate may be obtained by the cladding bonding of an aluminum plate and a nickel plate, and by ultrasonically welding it to the bottom surface of the square casing, resistance welding or soldering of the lead to the nickel plate is made simple. Usage of such lead is taught, for example, in Japanese Laid-open Patent Application 9-320565. However, there is a problem that the bond between the lead plate and the casing is not rigid enough unless the layer of the aluminum in the cladding material is thick enough relative to the nickel plate.

Many means of resistance welding a lead to the nickel plate of the abovementioned cladding material are used for connecting the lead to the square casing. The welding operation must be performed quickly so as not to cause a thermal effect inside the square casing. For that reason, a material of a type which has better resistance welding properties than the nickel plate, or a material of a type which is not liable to have a thermal effect is desired.

SUMMARY OF THE INVENTION

An object of the present invention is to provide a cell which allows simple connection of a lead to a cell casing comprising an aluminum material.

The cell of the present invention, for achieving the object described above, comprises a casing obtained by forming an aluminum material into a cylindrical shape with a bottom; an electricity generating element housed in the casing; a sealing plate for hermetically sealing an open end of the casing; and a cladding material which is bonded to a bottom surface of the casing, the cladding material being obtained by bonding a stainless-steel plate and an aluminum plate together, wherein the aluminum plate side of the cladding material is bonded to the bottom surface of the casing by ultrasonic welding, and the aluminum plate has a thickness which is more than two times greater than a thickness of the stainless-steel plate.

Lead connection to a cell casing which serves as the positive electrode terminal of the cell is normally difficult, because it is formed from an aluminum material. However, since a cladding material is bonded to the bottom surface of the cell casing in the cell of the present invention, ultrasonic welding or soldering of the lead to the stainless-steel plate which constitutes this cladding material becomes simple. Because a stainless-steel material has low thermal conductivity, the transfer of heat to the cell casing during lead connection by resistance welding and the like is not liable to occur, and thermal effects are restrained. In addition, the stainless-steel material has excellent welding properties for resistance welding due to its high electrical resistance, and thus lead connection by resistance welding can be effected quickly and with certainty.

Specifically, the aluminum plate comprised in the cladding material in the configuration described above is formed to have a thickness of at least two times the thickness of the stainless-steel plate, as a result of which the thickness of the stainless-steel plate can be made to the minimum limit required, and the required aluminum plate thickness for bonding the cladding material by ultrasonic welding to the cell casing of aluminum material, can be secured.

In addition, by ultrasonic welding of the cladding plate to the bottom surface of the casing, the bonding of the cladding material to the aluminum plate can be performed simply.

DESCRIPTION OF THE PREFERRED EMBODIMENTS

Figure 1B:
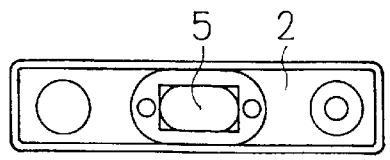
FIG. 1A is a frontal view, 1B is a plan view, 1C is a bottom view and 1D is a side view, respectively showing the configurations of a square cell according to an embodiment of the present invention.
Figure 1A:
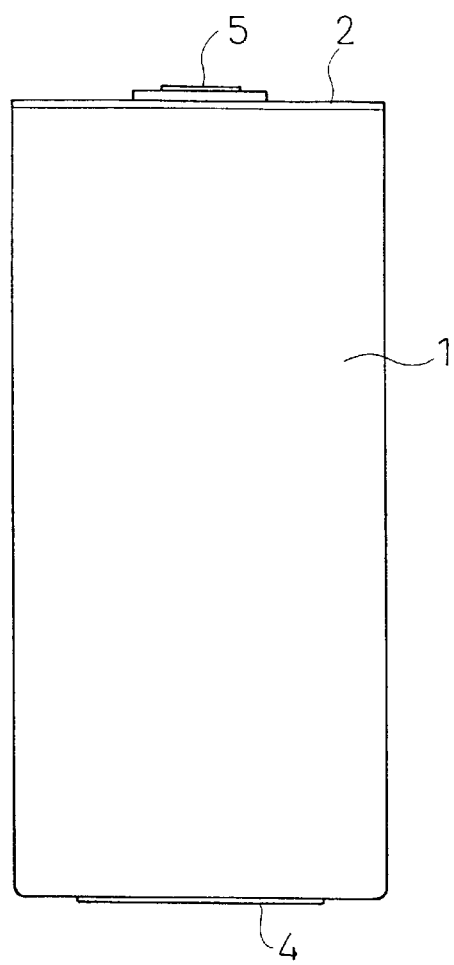
Figure 1D:
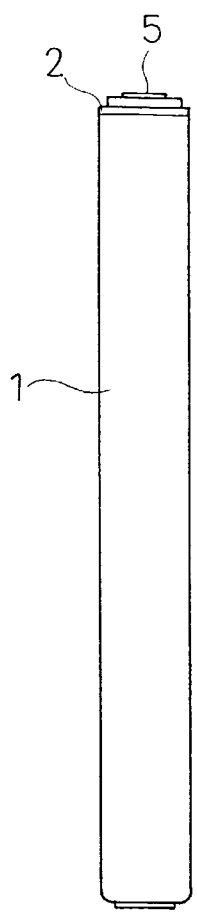

A description of the preferred embodiments of the present invention is given below with reference to the attached drawings.

FIGS. 1A to 1D show a configuration of a square cell according to an embodiment of the present invention. The square cell houses an electricity generating element in a square casing 1 obtained by forming an aluminum material into a square tube shape with a bottom, and is configured such that the inside of the square casing 1 is hermetically sealed by laser welding of a sealing plate to an open end thereof. Cell electrodes are formed in such a way that the square casing 1 is the positive electrode terminal, and a nickel plated iron rivet 5 is attached to the sealing plate 2, insulated from the abovementioned sealing plate 2, and is connected to the electricity generating element, thereby constituting the negative electrode terminal of the cell.

Accordingly, the electrical connection to an apparatus which uses the square cell as a power source involves lead connection between the square casing 1 and the rivet 5. Since the rivet 5, as described above, is made of nickel plated iron, bonding of a lead using resistance welding and the like can be performed easily, but since resistance welding and soldering to the square casing made of aluminum are difficult, a cladding material 4 is ultrasonically welded to the bottom surface of the square casing 1 so as to facilitate the lead bond to the square cased shaping 1.

Figure 1C:
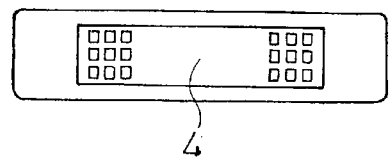
Figure 2:
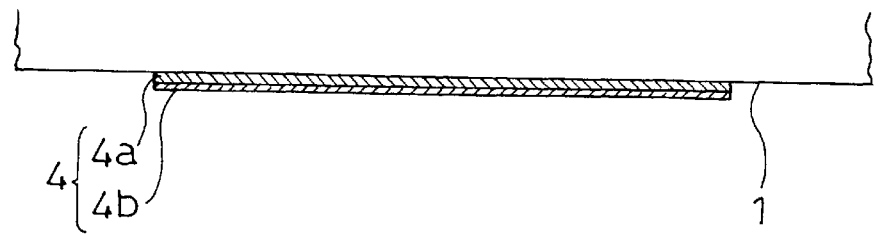
FIG. 2 is a cross-sectional view showing the configuration of a cladding material.

The abovementioned cladding material 4, as shown in FIG. 2, is configured from the cladding bonding of an aluminum plate 4a and a stainless-steel plate 4b, and the aluminum plate 4a side is bonded, facing the square casing 1, to the bottom surface of the square casing 1 by ultrasonic welding. The cladding material 4 in the present embodiment is formed from an aluminum plate 4a having a thickness of 0.2 mm and a stainless-steel plate having a thickness of 0.05 mm, and the thickness ratio is preferably such that the aluminum plate 4a is at least two times the thickness of the stainless-steel plate 4b. Since the stainless-steel plate 4b can be resistance welded and soldered easily, the connection of the lead to the square casing 1 becomes simple, and since the thermal conductivity of the stainless-steel material is low, heat is not liable to be conducted to the square casing 1 side during the welding of the lead and thermal effects inside the square casing 1 can be suppressed. In addition, the aluminum plate 4a is abutted against the square casing 1 formed from an aluminum material, ultrasonically excited by application of ultrasonic welding points to the stainless-steel plate 4b, and ultrasonic welding takes place between the aluminum plate 4a and the square casing 1. Since the welding is made between aluminum and aluminum, they can be securely bonded. It will be noted that the plurality of concave parts shown in FIG. 1C are traces of the abutment of the abovementioned ultrasonic welding points.

As described above, the aluminum plate 4a having a thickness of 0.2 mm and the stainless-steel plate 4b having a thickness of 0.05 mm bonded to each other are used as the cladding material 4 in this embodiment. Meanwhile, it has been found that, when bonding such cladding material 4 to the aluminum casing by ultrasonic welding, the ratio of thickness of the aluminum plate 4a to that of the stainless-steel plate 4b greatly influences the joining strength. The reason for this, though not yet clear, is discussed below.

Figure 3:
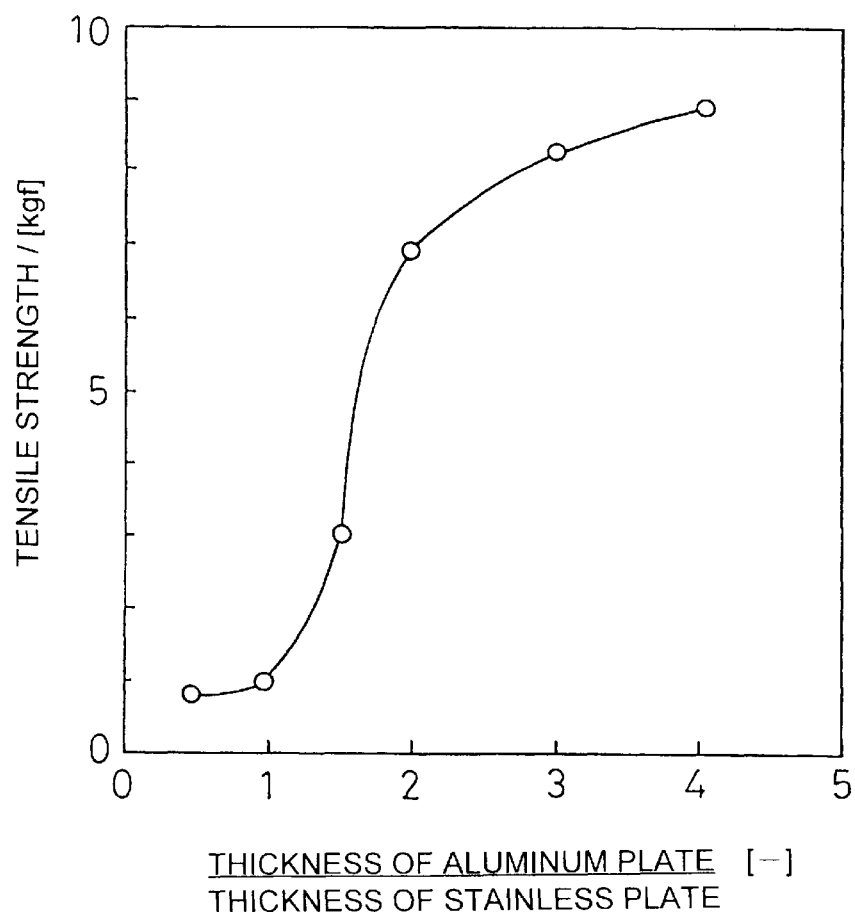
FIG. 3 is a graph showing the correlation between a ratio of thickness of an aluminum plate to a stainless-steel plate and the bonding strength of the cladding material to a casing.

The ultrasonic welding is a method for joining different materials by frictional heat generated by giving vibration to the bonding points. It is assumed that the closer the conditions such as the temperature in the vicinity of the bonding points or the conductivity and accumulativeness of heat of the materials are, the more rigidly they can be bonded. Accordingly, it is most desirable that the bonding points are made of the same material. When this theory is applied to the cladding material 4 of this embodiment, since the cladding material 4 consists of a metal which has relatively high thermal conductivity, such as aluminum, and a metal, such as stainless-steel having low thermal conductivity, when welding another metallic part to the aluminum part, though it may depend on various other conditions, it is expected that the stainless-steel part will affect the conditions such as thermal conductivity/accumulativeness at the welding point. In other words, in the present invention, the fact that the conditions of the aluminum on the casing side which is welded and those of the aluminum on the cladding material side are different, may be one of the factors which greatly affect the bonding strength. Consequently, it is assumed that the bonding strength could be increased if the thickness of the aluminum plate 4a was greater than that of the stainless-steel plate 4b. FIG. 3 shows the results of measurement of bonding strength between the casing and the cladding material 4 with the ratio of thickness of the aluminum part 4a to that of stainless-steel part 4b in the cladding material 4 being variously changed. As it can be seen from the figure, the bonding strength drastically increases when the thickness of aluminum is more than two times greater than the thickness of stainless-steel.

Therefore, it is preferable to construct the cladding material 4 with a greater thickness of aluminum than that of stainless-steel, and that the ratio of the thickness of aluminum to that of stainless-steel is 2 or more.

Figure 4:
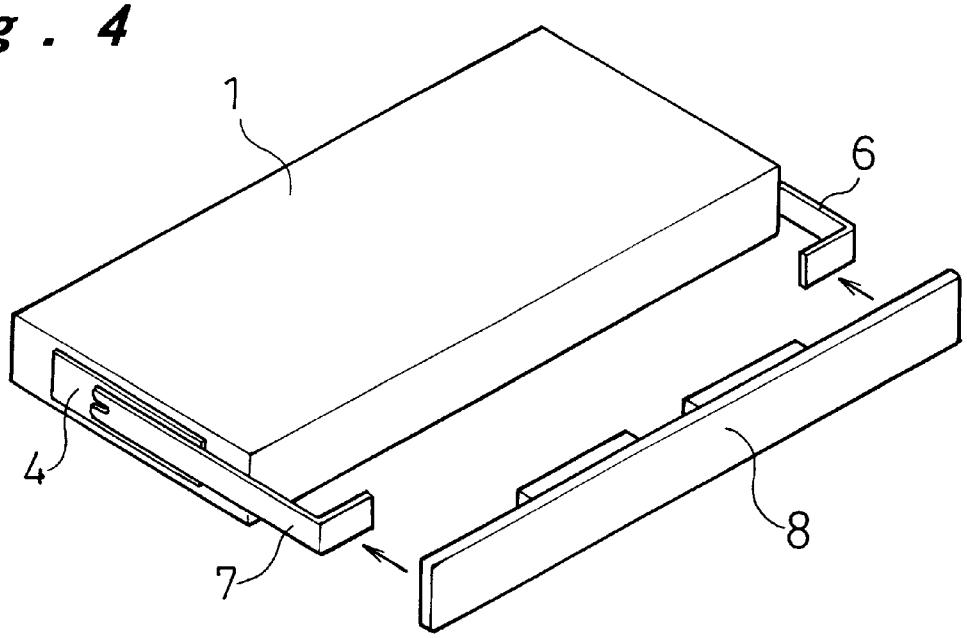
FIG. 4 is a perspective view showing an examples of a cell pack in which there is a lead connection to a square cell.

FIG. 4 shows an example of a cell pack configured from leads which are respectively connected to both the positive and negative electrode terminals of the square cell of the abovementioned configuration.

As shown in FIG. 4, one end of a negative electrode lead 6 is resistance welded to the rivet 5 which is the negative electrode terminal, while one end of a positive lead 7 is resistance welded to the cladding material 4 which is the positive electrode terminal, both of the negative and positive electrode leads are drawn out, and a circuit substrate 8 constituting a charge control circuit is connected to the respective other ends of the negative electrode lead 6 and the positive electrode lead 7, thereby constructing the cell pack equipped with a charge control circuit.

As set forth above, according to the present invention, since a cladding material obtained by the bonding of a stainless-steel plate and aluminum plate is joined to the bottom surface of a square casing, when a lead is connected to the square casing which is the positive electrode terminal, the stainless-steel plate which is simple to resistance weld and to solder can be used, and a square cell allowing simple lead connection can be provided.

While preferred embodiments of the invention have been described using specific terms, such description is for illustrative purposes only, and it is to be understood that changes and variations may be made without departing from the spirit or scope of the following claims.

What is claimed is:

1. A cell comprising:
   a casing formed of an aluminum material having a cylindrical shape side portion, a bottom and an open end;
   an electricity generating element housed in the casing;
   a sealing plate hermetically sealing said open end of the casing; and
   a cladding material bonded to a bottom outer surface of the casing, said cladding material including a stainless-steel plate bonded to an aluminum plate together, wherein
   the aluminum plate of the cladding material is bonded to the bottom surface of the casing by ultrasonic welding; and
   the aluminum plate has a thickness which is more than two times greater than a thickness of the stainless-steel plate.

2. The cell according to claim 1 wherein the thickness of the aluminum plate is 0.2 mm.

3. The cell according to claim 2 wherein the thickness of the stainless-steel plate is 0.05 mm.

4. The cell according to claim 1 wherein the thickness of the stainless-steel plate is 0.05 mm.

5. The cell according to claim 1 further comprising an electrode lead resistance welded to the stainless-steel plate.

6. The cell according to claim 1 further comprising an electrode lead soldered to the stainless-steel plate.

7. A cell comprising:

a casing formed of an aluminum material having an outer surface and an open end;

an electricity generating element housed in said casing;

a sealing plate hermetically sealing said open end of said casing;

a cladding material member having a stainless-steel plate bonded to an aluminum plate;

said cladding material member being bonded to said outer surface of the casing with said aluminum plate being bonded to the outer surface of the casing; and said aluminum plate having a thickness which is at least two times greater than a thickness of the stainless-steel plate.

8. The cell according to claim 7 wherein an ultrasonic weld bonds said aluminum plate to said outer surface.

9. The cell according to claim 8 further comprising an electrode lead resistance welded to the stainless-steel plate.

10. The cell according to claim 8 further comprising an electrode lead soldered to the stainless-steel plate.

11. The cell according to claim 7 further comprising an electrode lead resistance welded to the stainless-steel plate.

12. The cell according to claim 7 further comprising an electrode lead soldered to the stainless-steel plate.

13. The cell according to claim 7 wherein the thickness of the aluminum plate is 0.2 mm.

14. The cell according to claim 13 wherein the thickness of the stainless-steel plate is 0.05 mm.

15. The cell according to claim 7 wherein the thickness of the stainless-steel plate is 0.05 mm.

16. A method of manufacturing a cell comprising the steps of:

providing a casing formed of an aluminum material having an outer surface and an open end;

housing an electricity generating element in said casing;

hermetically sealing said open end of said casing with a sealing plate;

providing a stainless-steel plate and an aluminum plate having a thickness which is at least two times greater than a thickness of said stainless-steel plate;

clad bonding said stainless-steel plate bonded to said aluminum plate to form a cladding material member; and bonding said cladding material member to said outer surface of the casing by ultrasonically welding said aluminum plate to the outer surface of the casing via transmission through said stainless-steel plate.

17. The method according to claim 16 further comprising resistance welding an electrode lead resistance to the stainless-steel plate.

18. The method according to claim 16 further comprising soldering an electrode lead resistance to the stainless-steel plate.

19. The method according to claim 16 wherein the thickness of the aluminum plate is 0.2 mm.

20. The method according to claim 16 wherein the thickness of the stainless-steel plate is 0.05 mm.

* * * * *